(12) United States Patent
Ashizawa (10) Patent No.: US 8,824,071 B2
(45) Date of Patent: Sep. 2, 2014

(54) LENS BARREL AND CAMERA

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 218 days.

(21) Appl. No.: 13/227,971

(22) Filed: Sep. 8, 2011

(65) Prior Publication Data

US 2012/0224274 A1    Sep. 6, 2012

(30) Foreign Application Priority Data

Sep. 15, 2010   (JP) ................................. 2010-207115
Sep. 2, 2011    (JP) ................................. 2011-191586

(51) Int. Cl.
G02B 7/02    (2006.01)

(52) U.S. Cl.
USPC ........................................................ 359/824

(58) Field of Classification Search
USPC .................................................. 359/696, 824
See application file for complete search history.

(56) References Cited

U.S. PATENT DOCUMENTS

| | | | |
|---|---|---|---|
| 5,644,440 A | 7/1997 | Akada | |
| 5,812,330 A | 9/1998 | Akada | |
| 2007/0091462 A1 | 4/2007 | Sasaki | |
| 2008/0144201 A1* | 6/2008 | Koc et al. ...................... | 359/824 |

FOREIGN PATENT DOCUMENTS

| | | |
|---|---|---|
| JP | B2-01-017354 | 3/1989 |
| JP | A-8-179184 | 7/1996 |
| JP | A-2001-141977 | 5/2001 |
| JP | A-2006-187114 | 7/2006 |
| JP | A-2006-191730 | 7/2006 |
| JP | A-2007-114707 | 5/2007 |
| JP | A-2008-152265 | 7/2008 |
| JP | A-2008-187839 | 8/2008 |
| JP | A-2010-271622 | 12/2010 |
| JP | A-2011-28094 | 2/2011 |

OTHER PUBLICATIONS

Notice of Reasons for Rejection issued in Japanese Patent Application No. 2010-207115 dated Sep. 18, 2012 (with translation).
Office Action issued in Japanese Patent Application No. 2011-191586 dated Jul. 23, 2013 (with translation).
Notice of Reasons for Rejection dated Dec. 3, 2014 from Japanese Patent Application No. 2011-191586 (with English-language translation).

* cited by examiner

*Primary Examiner* — Joseph P Martinez
(74) *Attorney, Agent, or Firm* — Oliff PLC (57) ABSTRACT

A lens barrel includes a linear vibration actuator and a lens ring. The linear vibration actuator includes a vibrating element, relative motion member and pressurizing mechanism. The vibrating element generates a driving force at a driving face in parallel with an optical axis by oscillation of an electromechanical conversion element. The relative motion member is in pressure contact with the driving face and linearly moves in parallel with the optical axis with respect to the vibrating element. The pressurizing mechanism applies a pressure force between the driving face and the relative motion member. The lens ring holds a photographic lens and is linearly moved by the relative motion member in parallel with the optical axis. The linear vibration actuator includes a first linear guide receiving the pressure force applied to the relative motion member, and the lens ring includes a second linear guide guiding the lens ring to linearly move.

13 Claims, 11 Drawing Sheets

LENS BARREL AND CAMERA

This application is based on and claims the benefit of priority from Japanese Patent Application No. 2010-207115 filed on 15 Sep. 2010 and 2011-191586 filed on 2 Sep. 2011, the contents of which are incorporated herein by reference.

BACKGROUND OF THE INVENTION

1. Field of the Invention

The present invention relates to a lens barrel provided with a vibration actuator and to a camera.

2. Related Art

A vibration actuator, as disclosed in Patent Document 1, generates a progressive vibration wave (below abbreviated as "progressive wave") at a driving face of an elastic body utilizing the expansion and contraction of a piezoelectric body. An elliptic motion is generated at the driving face by this progressive wave, and wave crests of the elliptic motion drive a moving element which is in pressure contact with the wave crests. Such a vibration actuator has the characteristic of having a high torque even at a low revolution rate. Therefore, when installed in a driving device, the vibration actuator has advantages that it is possible to omit gears of the driving device, so that it is possible to achieve silencing due to lack of gear noise and an increase in the positioning accuracy.

A technique is disclosed in Patent Document 2, which directly drives a lens barrel of a steel camera or an automatically focusing lens (hereinafter referred to as "AF lens") of an interchangeable lens of an electronic camera, using a linear vibration actuator.

Patent Document 1: Japanese Examined Patent Application No. H1-17354

Patent Document 2: Japanese Unexamined Patent Application No. 2006-187114

SUMMARY OF THE INVENTION

The lens barrel having the linear vibration actuator recited in Patent Document 2 employs a pressure force that is applied between a vibrating element and a relative motion member in a radial direction. Structural members configured for applying the pressure force are disposed radially outward from a side surface of a holding frame for an AF lens. Accordingly, this lens barrel poses a problem to render its radial dimension to increase.

The present invention provides a lens barrel that enables its downsizing and a camera having this lens barrel.

The present invention solves the above problem. In order to facilitate understanding, explanations are made referring to added reference numbers which correspond to embodiments of the present invention, but the present invention is not limited by this.

In a first aspect of the present invention, a lens barrel (30) is provided, which includes a linear vibration actuator (10, 210) and a lens ring (38, 238). The linear vibration actuator (10, 210) includes a vibrating element (35, 235), a relative motion member (36, 236) and a pressurizing mechanism (34, 234). The vibrating element (35, 235) is configured to generate a driving force at a driving face (35c) in parallel with an optical axis (OA) by oscillation of an electromechanical conversion element (50). The relative motion member (36, 236) is configured to be in pressure contact with the driving face (35c) and to linearly move in parallel with the optical axis (OA) with respect to the vibrating element (35, 235) by the driving force. The pressurizing mechanism (34, 234) is configured to apply a pressure force between the driving face (35c) of the vibrating element (35, 235) and the relative motion member (36, 236). The lens ring (38, 238) is configured to hold a photographic lens (L3) and to be linearly moved by the relative motion member (36, 236) in parallel with the optical axis OA), along with the relative motion member (36, 236).

The linear vibration actuator (10, 210) includes a first linear guide (40, 240) which receives the pressure force applied to the relative motion member (36, 236), and the lens ring (38, 238) includes a second linear guide (41, 42, 241, 242) which guides the lens ring (38, 238) to linearly move.

In a second aspect of the present invention, the lens barrel (30) according to the first aspect is employed in a camera (1).

In a third aspect of the present invention, a lens barrel (30) is provided, which includes a linear vibration actuator (10, 210, 410) and a lens ring (38, 238, 438).

The linear vibration actuator (10, 210, 410) includes a vibrating element (35, 235, 435), a relative motion member (36, 236, 436) and a pressurizing mechanism (34, 234, 434). The vibrating element (35, 235, 435) is configured to generate a driving force at a driving face (35c) in parallel with an optical axis (OA) by oscillation of an electromechanical conversion element (50). The relative motion member (36, 236, 436) is configured to be in pressure contact with the driving face (35c) and to linearly move in parallel with the optical axis (OA) with respect to the vibrating element (35, 235, 435) by the driving force. The pressurizing mechanism (34, 234, 434) is configured to apply a pressure force between the driving face (35c) of the vibrating element (35, 235, 435) and the relative motion member (36, 236, 436) in a direction not intersecting the optical axis (OA).

The lens ring (38, 238, 438) is configured to hold a photographic lens (L3) and to be linearly moved by the relative motion member (36, 236, 436) in parallel with the optical axis (OA), along with the relative motion member (36, 236, 436).

In a fourth aspect of the present invention, the lens barrel (30) according to the third aspect is employed in a camera (1).

The constitutions explained with the attached reference numbers may be suitably improved or may be at least a partly substituted with other constituent elements.

According to the present invention, it is possible to provide a downsizable lens barrel that mounts a linear vibration actuator and a camera provided with this lens barrel.

BRIEF DESCRIPTION OF THE DRAWINGS

FIG. 2 is a partial sectional view of the lens barrel in which a vibration actuator of a first embodiment is built in;

DETAILED DESCRIPTION OF THE INVENTION

Below, embodiments of a lens barrel, which is provided with a vibration actuator of the present invention, and of a camera, will be explained in detail with reference to the attached drawings.

Figure 1:
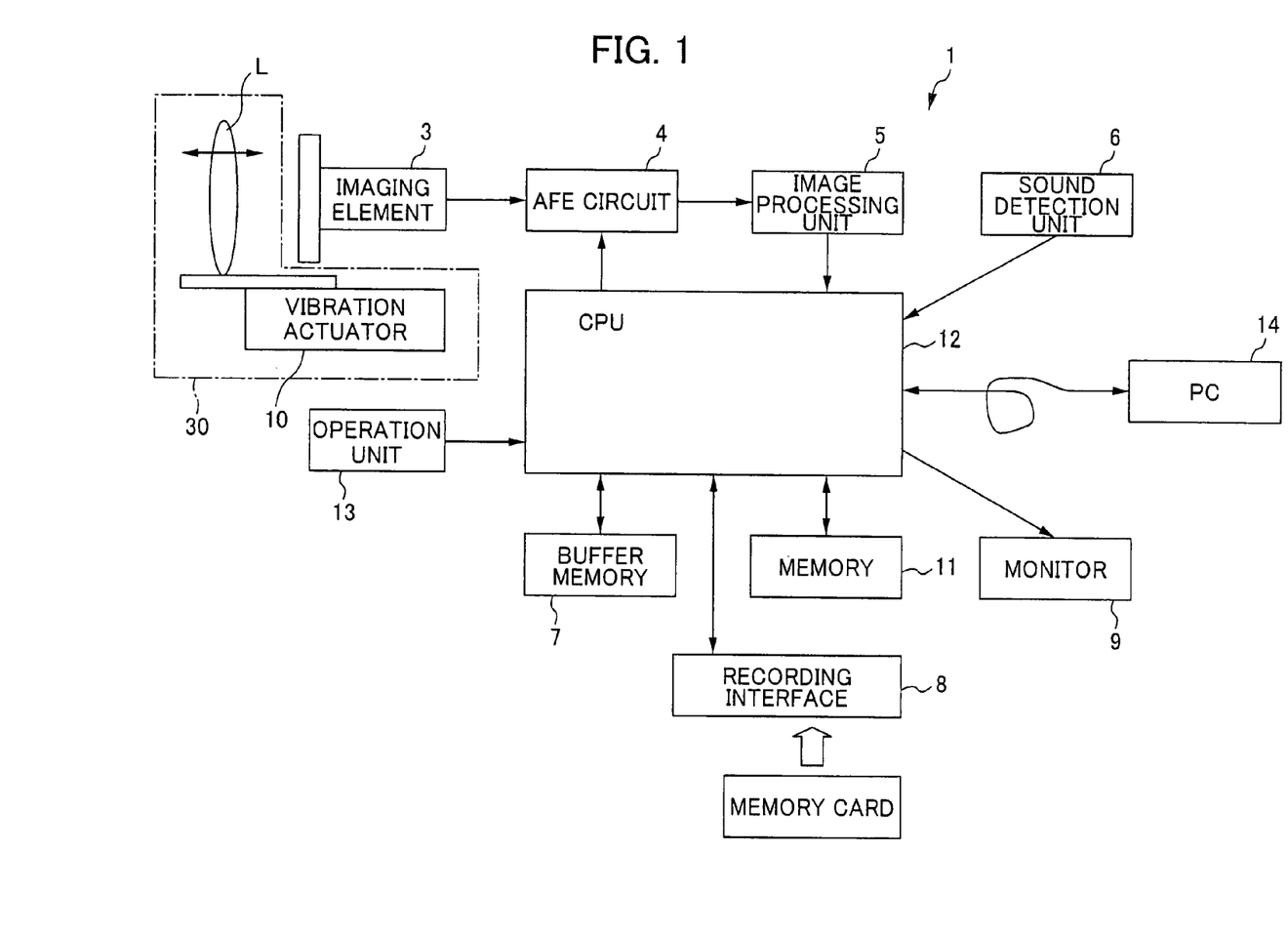
FIG. 1 is a drawing explaining a lens barrel mounted on a camera.

FIG. 1 is a drawing explaining an electronic camera 1 to which a lens barrel 30 is attached. The electronic camera 1 of the present embodiment is provided with an imaging element 3, an AFE (analog front end) circuit 4, and an image processing unit 5.

The electronic camera 1, which is further constituted of a sound detection unit 6, a buffer memory 7, a recording interface 8, a monitor 9, an operation unit 13, a memory 11, and a CPU 12, is communicably connectable to an external PC 14.

The imaging element 3 is constituted of a CMOS imaging element or the like, on which light receiving elements are two-dimensionally arranged on a light receiving face. The imaging element 3 performs photoelectric conversion of an image of a photographic subject generated by a luminous flux passing through a photographic optical system L of the lens barrel 30, so that the imaging element 3 generates an analog image signal. The analog image signal is input to the AFE circuit 4.

Then, an exposure time (shutter speed) applied to the imaging element 3 is determined by the operation unit 13 or a condition of the image of the photographic subject.

The AFE circuit 4 performs gain adjustment (signal amplification corresponding to the ISO sensitivity) of the analog image signal. More specifically, the AFE circuit 4 changes the image sensitivity within a predetermined range according to sensitivity setting instructions from the CPU 12. The AFE circuit 4 further converts the image signal having undergone analog processing to digital data by a built in A/D conversion circuit. This digital data is input to the image processing unit 5.

The image processing unit 5 performs various types of image processing of the digital image data.

The buffer memory 7 temporarily records pre-processing and post-processing image data for image processing performed by the image processing unit 5.

The sound detection unit 6, which is constituted of a microphone and a signal amplifier, mainly detects and captures sound from a direction of the photographic subject at the time of motion picture photography, and transmits this data to the CPU 12. The sound detection unit 6 may employ a built-in microphone of the electronic camera 1 and an external microphone attached to an attachment point of the electronic camera 1. The electronic camera 1 is so configured that the attached external microphone is detected.

The recording interface 8 having a connector (not shown) performs writing of data to a recording medium connected to the connector, or reading of data from the recording medium.

The monitor 9 is constituted of a liquid crystal panel or the like, and displays an image or an operation menu or the like in response to an instruction from the CPU 12.

The operation unit 13 indicates a mode dial, cross key, setting button and release button to allow a user to input settings. The operation unit 13 sends an operation signal according to any operation made through the operation unit 13 to the CPU 12. Settings for still photography and motion picture photography are set through the operation unit 13.

The CPU 12 performs centralized control of operations performed by the electronic camera 1 by executing a computer program stored in a ROM (not shown). For example, it performs AF (autofocus) operation control, AE (auto-exposure) operation control, auto white balance control, and the like.

The memory 11 records sequential image data having undergone image processing.

The electronic camera 1 having such a constitution captures an image corresponding to a motion picture.

The lens barrel 30 attached to the electronic camera 1 has the photographic optical system L, which is constituted of a plurality of optical lenses that form an image of the photographic subject on the light receiving face of the imaging sensor 3. In FIG. 1, an optical lens system is simplified and shown as a single lens. Further, among a group of optical lenses, an optical lens L3 for autofocusing (shown in FIG. 2) is driven by the vibration actuator 10.

First Embodiment

Figure 2:
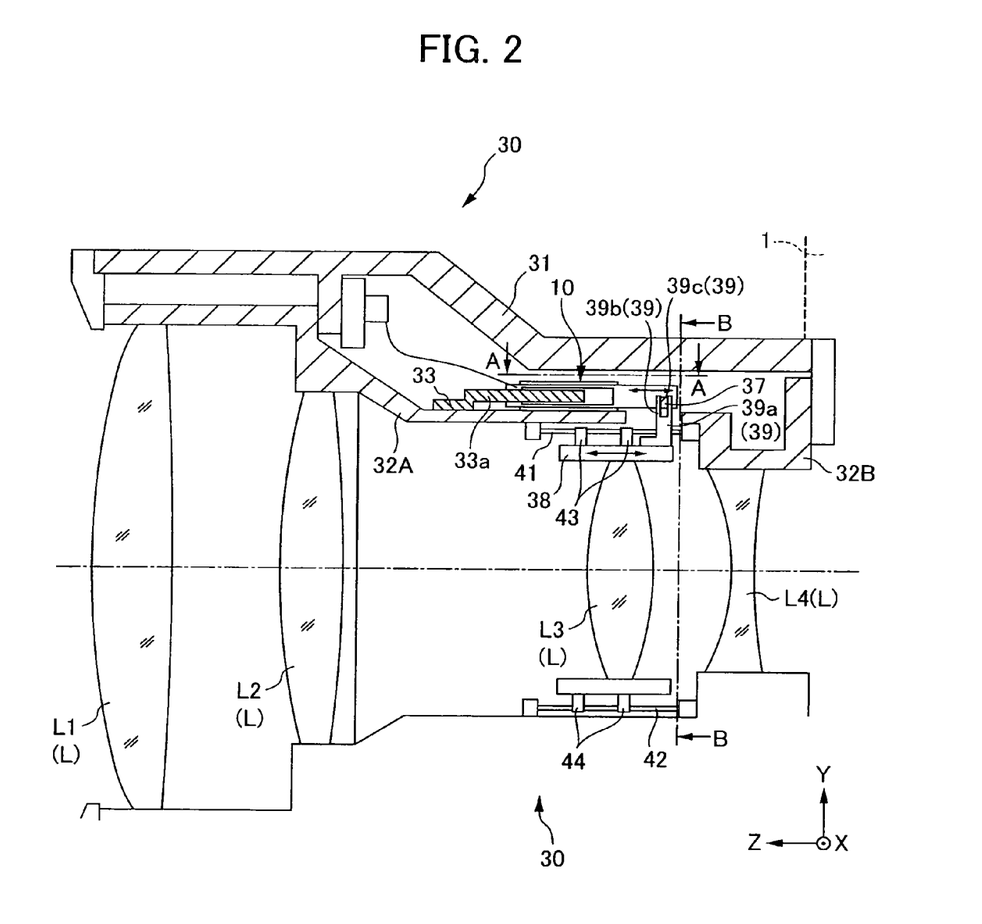
Figure 3:
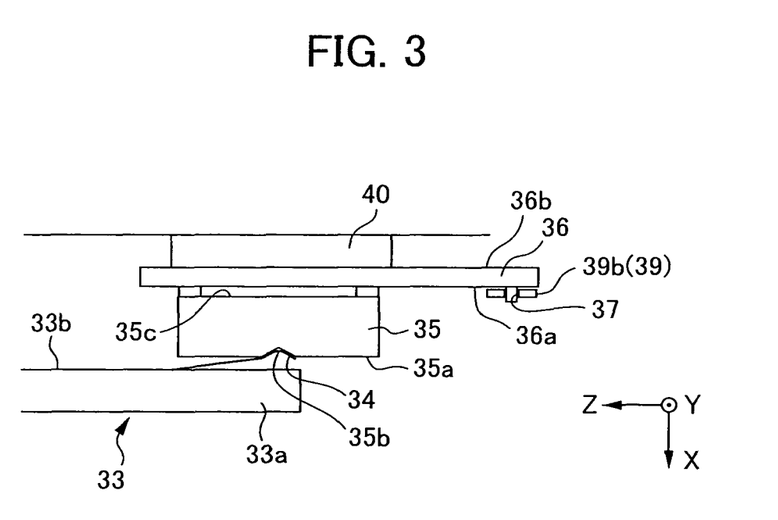
FIG. 3 is a partial enlargement view when seen from a direction A shown in FIG. 2.
Figure 4:
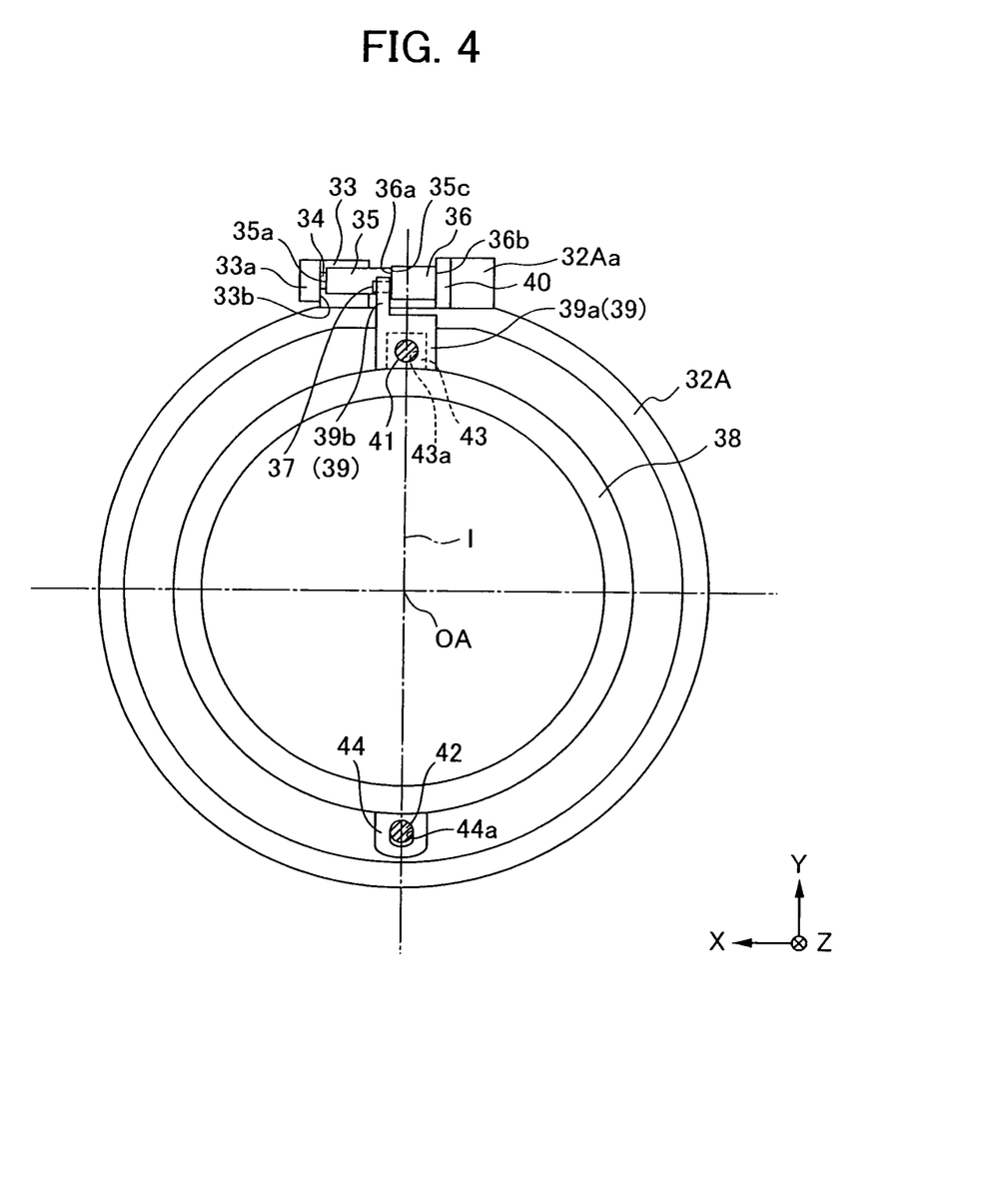
FIG. 4 is a view seen from a direction B-B shown in FIG. 2.

FIG. 2 is a partial sectional view of the lens barrel 30 in which the vibration actuator 10 of the first embodiment is built in. FIG. 3 is a partial enlargement view when seen from a direction A shown in FIG. 2. FIG. 4 is a view when seen from a direction B-B shown in FIG. 2.

For ease of explanation and understanding an XYZ Cartesian coordinate system is provided in the drawings when necessary. In this coordinate system, a direction towards the left side when seen by a user is defined as +X direction, when the electronic camera 1 is positioned by the user to photograph a horizontally oblong image with an optical axis OA being set horizontal (below referred to as "normal position"). A direction going upwards is +Y direction while the electronic camera 1 is in the normal position. A direction towards the photographic subject is +Z direction while the electronic camera 1 is in the normal position.

The lens barrel 30 includes an outer fixed tube 31 which is fixed with respect to the electronic camera 1, and the above mentioned photographic optical system L which includes optical lenses L1, L2, L3, and L4 aligned in sequence from the photographic subject side.

The optical lens L3 of the photographic optical system L is configured for autofocusing, and is driven by the vibration actuator 10. Of the other optical lenses, the optical lenses L1 and L2 which are on a closer side of the photographic subject than the optical lens L3 are fixed to an inner first fixed tube 32A which is disposed at the photographic subject side inside the outer fixed tube 31. The optical lens L4 which is on a closer side of a formed image than the optical lens L3 is fixed to an inner second fixed tube 32B disposed at a formed image side inside the outer fixed tube 31.

The vibration actuator 10 of the present embodiment is disposed at an outer circumferential face of the inner first fixed tube 32A.

The vibration actuator 10 includes a support member 33, a pressurizing spring 34, a vibrating element 35, a moving element 36 and a linear guide 40. The support member 33 is fixed at the outer circumferential face of the inner first fixed tube 32A. The pressurizing spring 34 is mounted at the support member 33. The vibrating element 35 receives a pressure force applied by the pressurizing spring 34. The moving element 36 is driven by the vibrating element 35. The linear guide 40 is fixed at a fixing member 32Aa provided on an outer face of the inner first fixed tube 32A and contacts a face opposite to the vibrating element 35 of the moving element 36.

The support member 33, as shown in FIG. 4, is fixed at the outer circumferential face of the inner first fixed tube 32A, slightly on +X side relative to the center and +Y side of the inner first fixed tube 32A. The support member 33 has an extension 33a extending in −Z direction parallel to the optical axis OA from the fixed portion of the support member 33. The extension 33a has a rectangular cross section when cut at a face perpendicular to the optical axis OA.

The pressurizing spring 34 is a plate shaped member, one end of which is mounted at a side face 33b facing −X side of the extension 33a.

The vibrating element 35 is an approximately rectangular parallelepiped member having a side face 35a facing the side face 33b of the extension 33a. A groove 35b extending in a direction perpendicular to the optical axis OA is provided at an approximately central portion of the side face 35a of the vibrating element 35.

The other end of the pressurizing spring 34, one end of which is mounted at the side face 33b of the support member 33, is crimped at a predetermined angle in a transverse direction. An angled portion of the crimp fits into the groove 35b of the side face 35a, pressurizing the vibrating element 35 in the −X direction.

The moving element 36 is disposed adjacent to a driving face 35c which is opposite (−X side) to the side face 35a of the vibrating element 35. The moving element 36 consists of a light metal such as aluminum, and has a sliding face 36a opposite to the driving face 35c. The sliding face 36a is provided with sliding plating in order to improve the abrasion resistance.

The linear guide 40, which is in contact with a face 36b (−X side) opposite to the sliding face 36a of the moving element 36, is fixed at a guide fixing portion 40A fixed to the inner first fixed tube 32A.

The linear guide 40 is a linear bearing that causes the moving element 36 to be movable in a linear direction (Z direction in FIGS. 3 and 4) and to prevent from moving in other directions (X and Y directions). Spherical members and a smooth sliding member are provided inside the linear guide 40. In this manner, it is possible for the linear guide 40 to provide smooth movement in the Z direction being free of sliding resistance even if urging forces are applied to in the X and Y directions.

A protruding portion 37 is provided at the sliding face 36a of the moving element 36.

Further, an AF ring 38 which holds the optical lens L3 is disposed at an inner circumferential side of the inner first fixed tube 32A.

The AF ring 38 has an annular cross section perpendicular to the optical axis OA, and is provided with guide portions 43 and 44 that outwardly project at symmetrical positions (both ends of the diameter along the Y axis) centered about the optical axis OA. The guide portions 43 and 44 include fitting holes 43a and 44a, respectively.

A first linear rail 41 and a second linear rail 42 are provided across the interval between the inner first fixed tube 32A and the inner second fixed tube 32B. The first linear rail 41 is inserted through the fitting hole 43a of the guide portion 43, and the second linear rail 42 is inserted through the fitting hole 44a of the guide portion 44.

A coupling portion 39 for coupling with the moving element 36 extends in the +Y direction at the −Z side of the AF ring 38.

The coupling portion 39 is fixed to the AF ring 38, and has a base portion 39a provided with a hole through which the first linear rail 41 passes, and a fork portion 39b extending from the +X side of the base portion 39a in the +Y direction (approximately radial direction). A groove 39c is formed at a tip of the fork portion 39b. The groove 39c fits the protruding portion 37 provided at the sliding face 36a of the moving element 36. The driving force of the moving element 36 in a direction parallel to the optical axis OA is transmitted to the AF ring 38 by the coupling portion 39, causing the AF ring 38 to be driven.

Figure 5:
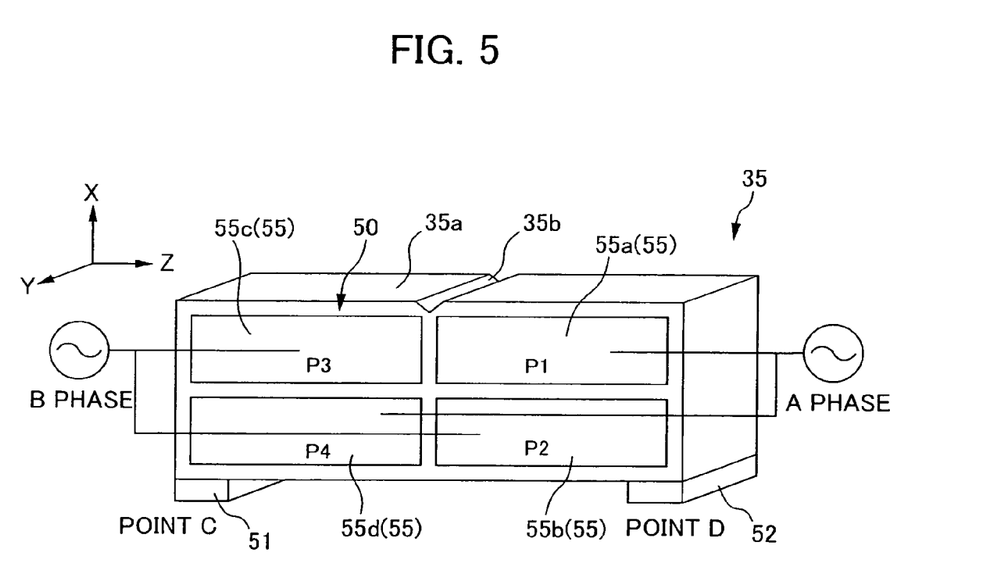
FIG. 5 is a drawing explaining in detail a vibrating element of the first embodiment.

FIG. 5 is a drawing explaining in detail the vibrating element 35.

The vibrating element 35 is constituted of an electromechanical conversion element (below referred to as a piezoelectric body) 50 such as a piezoelectric element or an electrostrictive element or the like which converts electrical energy into mechanical energy, and sliding members 51 and 52 disposed at the driving face 35c side of the electromechanical conversion element 50. The vibrating element 35 generates standing waves of a longitudinal primary mode vibration and standing waves of a flexing secondary mode vibration.

A front face of the piezoelectric body 50 is provided with an electrode 55 divided into four sections (55a, 55b, 55c, and 55d), and a rear face is provided with an undivided GND electrode. The four sections 55a, 55b, 55c and 55d of the electrodes 55 have the same polarization direction. A driving signal A phase is applied to the electrodes 55a and 55d, and a driving signal B phase is applied to the electrodes 55b and 55c.

The above described groove 35b is provided at the center portion of the vibrating element 35. Since the pressurizing spring 34 engages with the groove 35b, it is possible not only to prevent the pressurizing position from deviating, but also to provide support in a lengthwise direction.

The sliding members 51 and 52 are constituted of engineering plastic material having a good abrasion resistance. They are provided at locations where the amplitude of the standing waves of the longitudinal primary mode vibration is greatest, and further the amplitude of the standing waves of the flexing secondary mode vibration is greatest.

Figure 6:
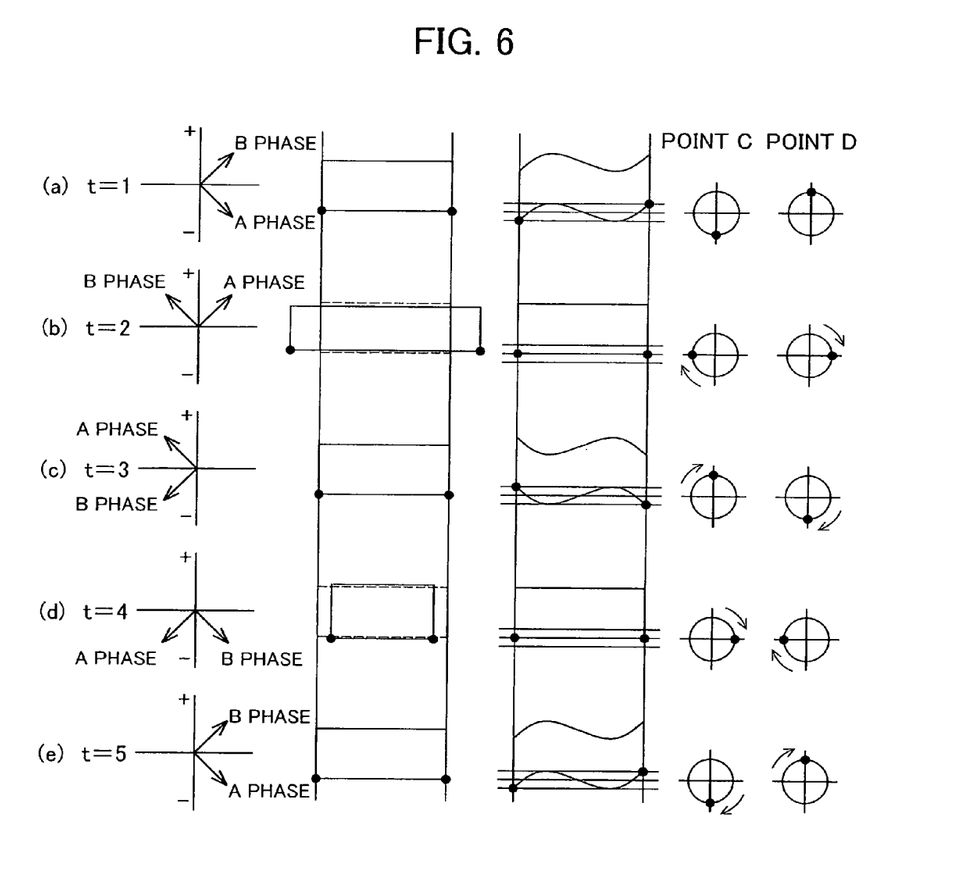
FIG. 6 is a diagram explaining vibrations generated by the vibrating element.

Next, the generation of vibrations in the vibrating element 35 will be explained in chronological sequence. FIG. 6 is a diagram explaining the vibration generated by the vibrating element.

(a) t=1: The A phase voltage is minus and the B phase voltage is plus.

Since a portion P1 where the electrode 55a of the piezoelectric body 50 is provided shrinks in the lengthwise direction, a portion P2 provided with the electrode 55b extends in the lengthwise direction, a portion P3 provided with the electrode 55c extends in the lengthwise direction, and a portion P4 provided with the electrode 55d shrinks in the lengthwise direction, a bending deformation arises as shown at the right center side of (a) of FIG. 6.

Further, since the portion P1 shrinks in the lengthwise direction, the portion P2 extends in the lengthwise direction, the portion P3 extends in the lengthwise direction, and the portion P4 shrinks in the lengthwise direction, displacements in the lengthwise direction offset each other. Accordingly, no longitudinal displacement occurs, as shown at the left center side of (a) of FIG. 6.

(b) t=2: The A phase voltage is plus and the B phase voltage is minus.

The portion P1 extends in the lengthwise direction, the portion P2 extends in the lengthwise direction, the portion P3 extends in the lengthwise direction, and the portion P4 extends in the lengthwise direction. Thus, a bending deformation does not arise, as shown at the right center side of (b) of FIG. 6.

Since the portions P1, P2, P3 and P4 extend in the lengthwise direction as described above, a deformation in the lengthwise direction arises as shown at the left center side of (b) of FIG. 6.

(c) t=3: The A phase voltage is plus and the B phase voltage is minus.

Since the portion P1 extends in the lengthwise direction, the portion P2 shrinks in the lengthwise direction, the portion P3 shrinks in the lengthwise direction, and the portion P4 extends in the lengthwise direction, a bending deformation arises as shown at the right center side of (c) of FIG. 6.

Since the portion P1 extends in the lengthwise direction, the portion P2 shrinks in the lengthwise direction, the portion P3 shrinks in the lengthwise direction, and the portion P4 extends in the lengthwise direction, lengthwise displacements offset each other. Accordingly, a longitudinal deformation does not arise as shown at the left center side of (c) of FIG. 6.

(d) t=4: The A phase voltage is minus and the B phase voltage is plus.

Since the portion P1 shrinks in the lengthwise direction, the portion P2 shrinks in the lengthwise direction, the portion P3 shrinks in the lengthwise direction, and the portion P4 shrinks in the lengthwise direction, a bending deformation does not arise as shown at the right center side of (d) of FIG. 6.

Since the portions P1, P2, P3 and P4 shrink in the lengthwise direction as described above, a displacement in the lengthwise direction arises, as shown at the center left side of (d) of FIG. 6.

(e) t=5: Return to the case of t=1 in (a) above

When the vibrations described above are generated, points C and D where the sliding members 51 and 52 are bonded undergo an elliptic motion as shown at the rightmost side of (a) to (e) of FIG. 6. The moving element 36 in pressure contact with these sliding members 51 and 52 receives a frictional force due to the elliptic motion, and is driven, accordingly.

Figure 7:
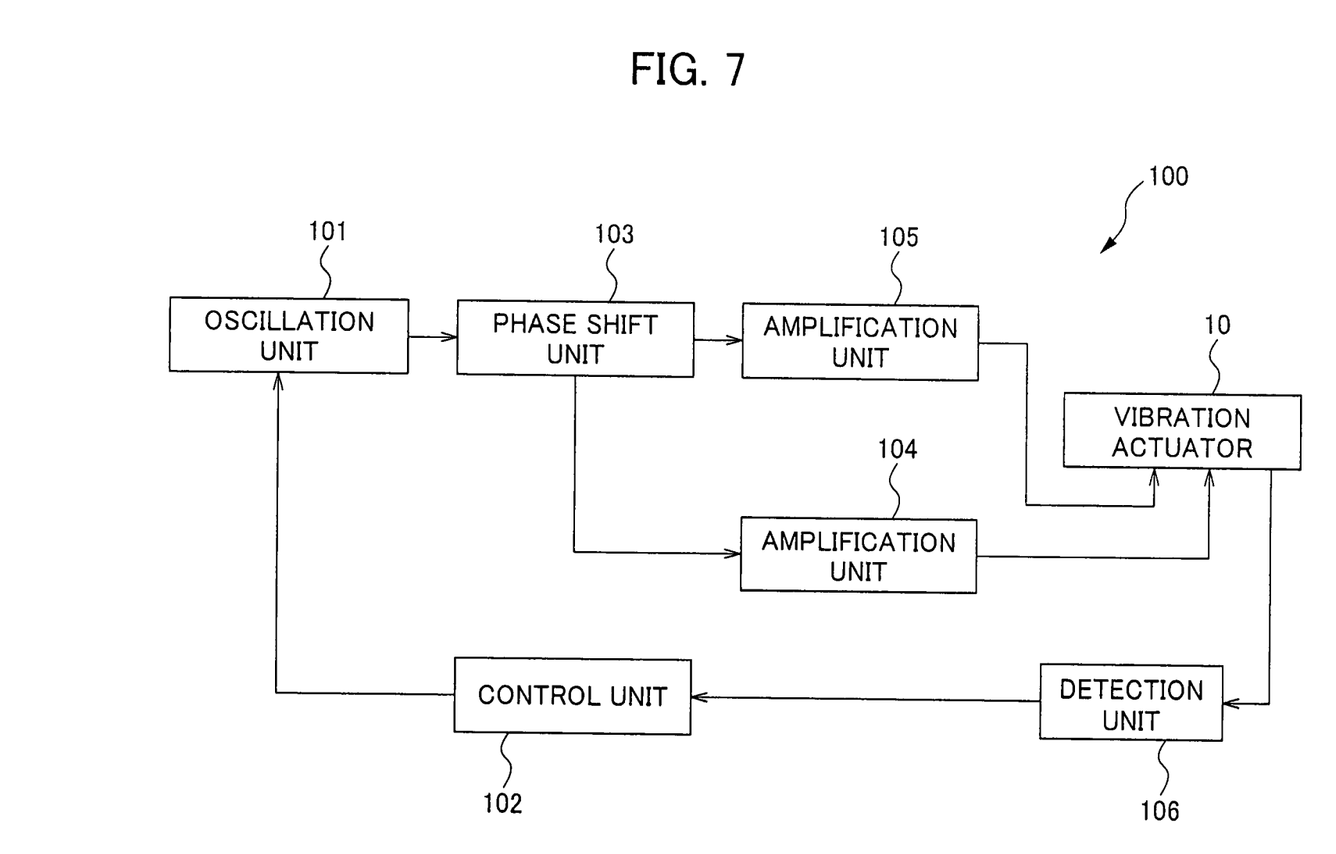
FIG. 7 is a block diagram explaining a driving device of the vibration actuator of the first embodiment.

FIG. 7 is a block diagram explaining a driving device 100 of the vibration actuator 10 of the first embodiment. The driving/control of the vibration actuator 10 will be explained.

An oscillation unit 101 generates a driving signal of a desired frequency by instructions sent from a control unit 102.

A phase shift unit 103 divides the driving signal generated by the oscillation unit 101 into two driving signals having a 90° phase shift.

Amplification units 104 and 105 respectively boost the two driving signals divided by the phase shift unit 103 to desired voltages.

The driving signals from the amplification units 104 and 105 are transmitted to the vibration actuator 10. A standing wave is generated at the vibrating element 35 to which the transmitted driving signals applied. Accordingly, elliptical movement occurs at the sliding elements 51 and 52, so that the moving element 36 is driven in a direction parallel to the optical axis OA.

The detection unit 106 is constituted of an optical encoder or a magnetic encoder or the like, and detects the position or speed of an object driven by the moving element 36, and transmits the detected values to the control unit 102 as an electric signal.

The control unit 102 controls driving of the vibration actuator 10 based on driving instructions from the CPU 12 of the camera 1 or inside the lens barrel 30. The control unit 102 receives a detection signal from the detection unit 106, and based on its value, obtains the position information and velocity information, and controls the frequency of the oscillation unit 101 and the voltage of the amplification portions 104 and 105 to achieve positioning at a target position. Further, the control unit 102 receives the photographing information (still photography mode/motion picture mode) from the lens barrel 30 or the camera 1. Based on this photographing information transmitted by the lens barrel 30 or the camera 1, the control unit 102 finely controls the frequency of the driving signal.

According to the present embodiment, the present invention provides effects below.

With the vibration actuator 10, the linear guide 40 receives the pressure force applied by the pressurizing spring 34. By coupling the protruding portion 37 provided at the moving element 36 and the fork portion 39b extending from the AF ring 38, a driving force generated by the moving element 36 of the vibration actuator 10 is transmitted to the AF ring 38, and the AF ring 38 is linearly driven. Accordingly, the first linear rail 41 and the second linear rail 42 which linearly guide the AF ring 38 are not subject to any force other than the linear driving force.

In this manner, the sliding resistance (loss) during linear motion of the optical lens L3 is greatly reduced, and it is possible to provide driving of the optical lens L3 with good efficiency.

Since the direction of the pressure to the vibrating element 35 is a direction tangential to the circumference of the lens barrel 30 such that the pressurizing spring 34 does not project in the radial direction of the lens barrel 30, it is possible that an increase in the size of the lens barrel 30 in the radial direction is prevented and the linear vibration actuator 10 is compactly installed.

One end of the pressurizing spring 34, another end of which is fixed at the supporting member 33, applies a pressure force to the vibrating element 35. The applied pressure force causes the vibrating element 35 to be pressed toward the moving element 36. The applied pressure force is oriented in a direction orthogonal to and not intersecting the optical axis OA. More specifically, the applied pressure force is oriented in a direction tangential to a circumference of a circle centered about the optical axis OA. In other words, the vibration actuator 10 is attached to an external circumferential surface of the inner first fixed tube 32A, which is cylindrical about the optical axis OA, and the pressure force applied by the pressurizing spring 34 of the vibration actuator 10 is oriented in a direction substantially tangential to the inner first fixed tube 32A. Furthermore, the pressure force applied by the pressurizing spring 34 is oriented in a direction (−X direction) orthogonal to a line I (shown in FIG. 4), which connects the optical axis OA and the first linear rail 41.

Since the pressurizing spring 34 does not protrude radially with respect to the lens barrel 30, it is possible to prevent the lens barrel 30 from increasing its radial dimension, thereby allowing compact mounting of the linear vibration actuator 10.

Respective members constituting the vibration actuator 10, the pressurizing spring 34, vibrating element 35, moving element 36, linear guide 40, are arranged in juxtaposition in the direction orthogonal to and not intersecting the optical axis OA. More specifically, the members constituting the vibrating element actuator 10 are arranged in the direction tangential to the circumference of the circle centered about the optical axis OA. In other words, the members constituting the vibration actuator 10 are attached to the external circumferential surface of the inner first fixed tube 32A, which is cylindrical about the optical axis OA, and the pressure force applied by the pressurizing spring 34 of the vibration actuator 10 is oriented in the direction substantially tangential to the inner first fixed tube 32A. Furthermore, the members constituting the vibration actuator 10 are arranged in the direction (−X direction) orthogonal to the line I (shown in FIG. 4), which connects the optical axis OA and the first linear rail 41.

Since the pressurizing spring 34 does not protrude in the radial direction of the lens barrel 30, it is possible to prevent the lens barrel 30 from increasing its radial dimension, thereby enabling compact mounting of the vibration actuator 10.

In addition, the pressure force generated in the vibration actuator is received by the linear guide 40 and the groove 39c of the coupling portion 39 provided at the AF ring 38 is mated with the protruding portion 37 provided at the moving element 36, so that the AF ring 38 is driven to move rectilinearly. In this manner, the first linear rail 41 and second linear rail 42 are free of forces other than a linearly driving force (a radial force is not exerted).

Accordingly, a sliding resistance (loss) of the AF lens L3 during linear movement will decrease, enabling efficient driving of the AF lens L3.

Second Embodiment

Figure 8:
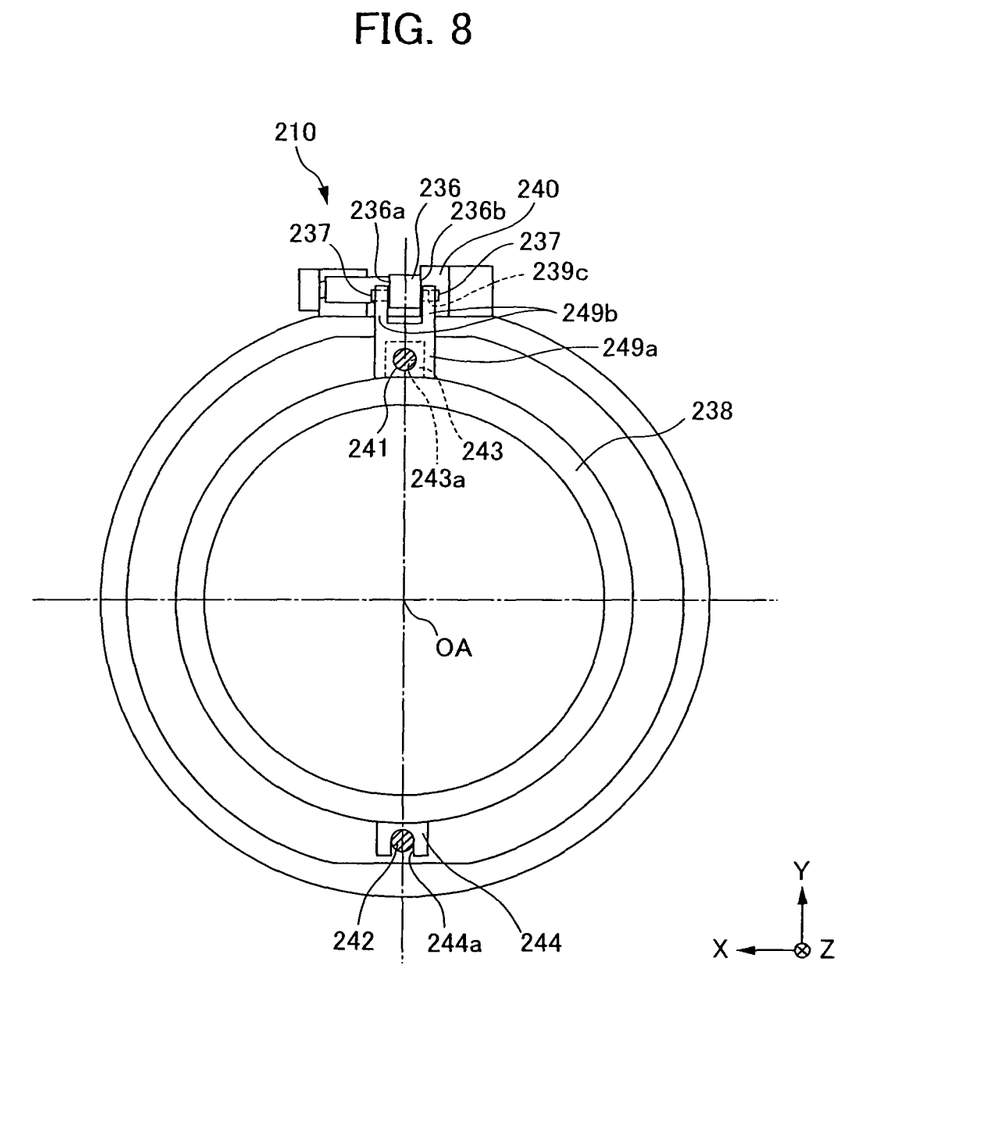
FIG. 8 is a drawing explaining a lens barrel according to a second embodiment of the present invention.

FIG. 8 is a drawing explaining a vibration actuator 210 of a lens barrel of the second embodiment of the present invention, and is a drawing corresponding to FIG. 3 of the first embodiment. In the second embodiment, protruding portions 237 of a moving element 236 are provided both at sliding face 236a of the moving element 236 and a side face 236b located on a side of a linear guide 240. At a coupling portion 239 fixed to an AF ring 238 there are two fork portions 239b extending from both ends of a base portion 239a, and grooves 239c formed at these fork portions 239b are respectively fit with the protruding portions 237 at two locations. Others except for these differences described above are the same as the first embodiment, and explanations thereof will not be repeated.

A center axis of the moving element 236 and a center axis of a first linear rail 241 which guides the AF ring 238 are aligned in the same radial direction of the AF ring 238. As mentioned above, the two fork portions 239b of the coupling portion 239 fit with the protruding portions 237 at positions symmetrical about this radius.

In this way, the driving force of the moving element 236 is evenly applied to the coupling portion 239 and the AF ring 238. Accordingly, during the linear driving of the AF ring 238, forces in directions other than a linear direction (in particular forces in a rolling direction) are not applied to the AF ring 238.

A fitting hole 243a provided at a guide portion 243 of the AF ring 238 is a circular hole. On the other hand, a fitting hole 244a provided at a guide portion 244 in the present embodiment is a u-shaped hole (u-shaped groove).

The u-shaped fitting hole 244a has the following advantages.

Figure 9:
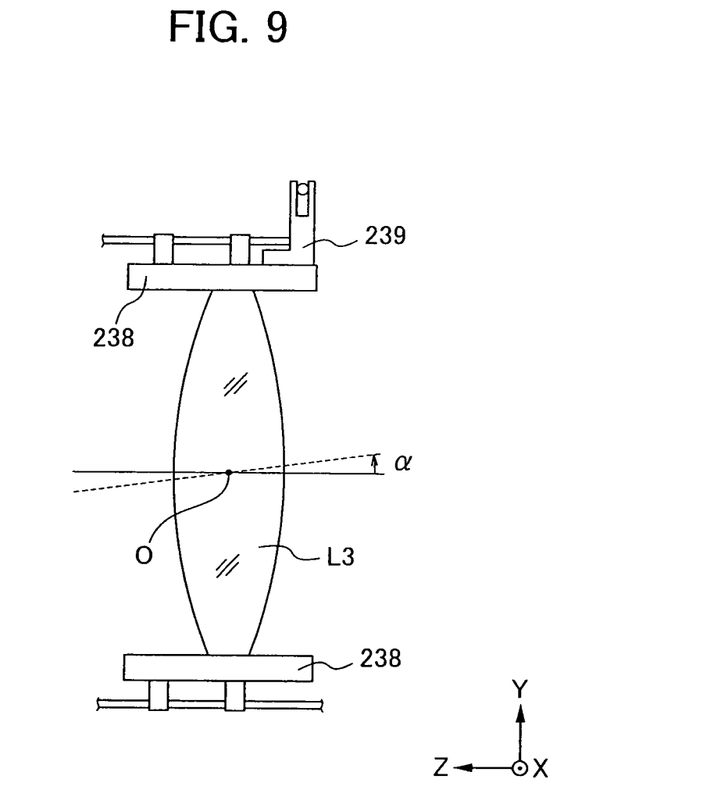
FIG. 9 is a drawing explaining a tilt of an AF ring with respect to an optical axis OA.

As shown in FIG. 9, the position of the coupling portion 239 is disposed displaced towards the −Z direction parallel to an optical axis OA, from a cross section perpendicular to the optical axis OA passing through the center O of an AF lens L3. Accordingly, a force acts on the AF ring 238 in a direction tilted with respect to the optical axis OA due to the position of its center of mass.

When the moving element 236 and the AF ring 238 are moving in an optical axis OA direction, a slight tilt may arise as a result of this force. FIG. 9 is a drawing explaining the tilt with respect to the optical axis OA; the axis of the AF ring 238 inclines by α degrees with respect to the optical axis OA (such a large angle will not occur in actuality and the angle is exaggerated in the drawing). If the hole of the guide portion 244 is a circular hole and a linear force is applied to the coupling portion 239, it may be possible that a sliding load arises between a second linear rail 242 and the hole of the guide portion 244 due to this inclination.

However, according to the present embodiment, even if the AF ring 238 slightly inclines, it is possible for the hole of the guide portion 244, which is a u-shaped groove and has an open end, to escape in the radial direction.

Further, the center axis of the moving element 236, the center axis of the first linear rail 241 and the center axis of the second linear rail 242 which guide the AF ring 238 are aligned with each other with respect to the radial direction of the AF ring 238. In this way, when a tilting motion arises, the sliding load is further reduced.

Accordingly, it is possible that the sliding resistance (loss) during linear motion of the AF lens is further reduced in the second embodiment than in the first embodiment.

Third Embodiment

Figure 10A:
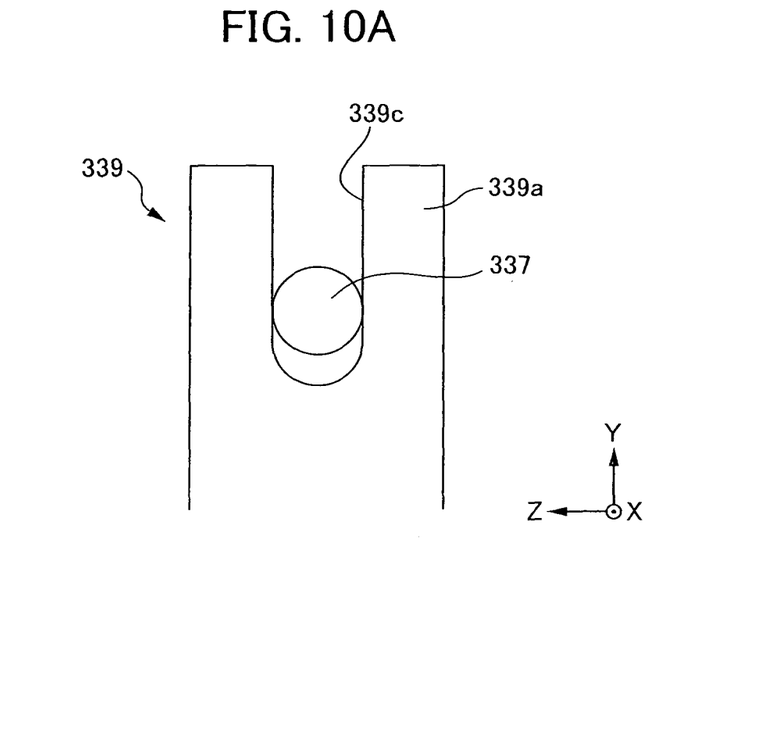
FIG. 10A is a drawing explaining a third embodiment of the present invention.
Figure 10B:
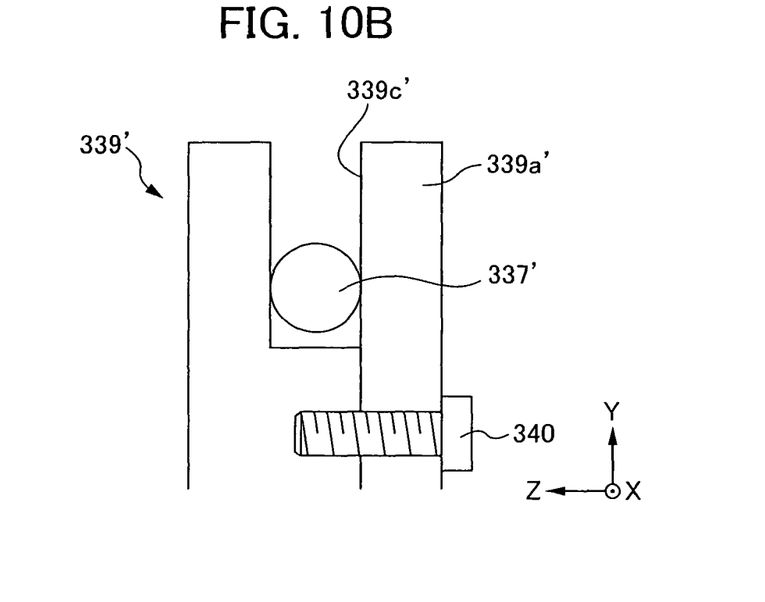
FIG. 10B shows a modification of the third embodiment.

FIG. 10 is a drawing explaining the third embodiment of the present invention.

The third embodiment, compared to the first embodiment, differs in the fitting method of a protruding portion 337 provided at a moving element and a groove 339c of a fork portion 339a connected to an AF ring. Others except for these differences described above are the same as the first embodiment, and explanations thereof will not be repeated.

If there is a gap between the protruding portion 337 and the groove 339c, at a time of startup or stopping, side faces of the protruding portion 337 and the groove 339c will collide with each other, generating an impact force which is transmitted to the AF ring. If this phenomenon is repeated, sliding portions of a linear rail and the groove 339c will suffer damage, and in this way a sliding resistance will arise.

In the embodiment shown in FIG. 10A, the protruding portion 337 is cylindrical and made of plastics, and its diameter is slightly greater than the width of the groove 339c. The protruding portion 337 is inserted into the groove 339c, causing the protruding portion 337 to mate with the coupling portion 339 (fork portion 339a). Since the groove 339c and the protruding portion 337 are mated with each other without a gap in the direction of the optical axis OA in this manner, rattling does not occur and there is no generation of an impact force resulting from collisions of the side faces of the protruding portion 337 and the groove 339c at a time of startup and stopping. Accordingly, it is possible to reduce sliding resistance and there is no damage to the sliding portions of the linear rail and the guide portions.

Further, FIG. 10B shows a modification of the third embodiment where a fork portion 339a' of a coupling portion 339' is made of two members held with a screw 340, such that a protruding portion 337' is held between these two members. Since the protruding portion 337' mates with a groove 339c' without a gap in the direction of the optical axis OA in this modification as well as the third embodiment, rattling does not arise, and there is no generation of an impact force resulting from collisions of the side faces of the protruding portion 337' and the groove 339c' at a time of startup and stopping. Accordingly, it is possible to reduce sliding resistance and there is no damage to the sliding portions of the linear rail and the guide portions.

Fourth Embodiment

Figure 11:
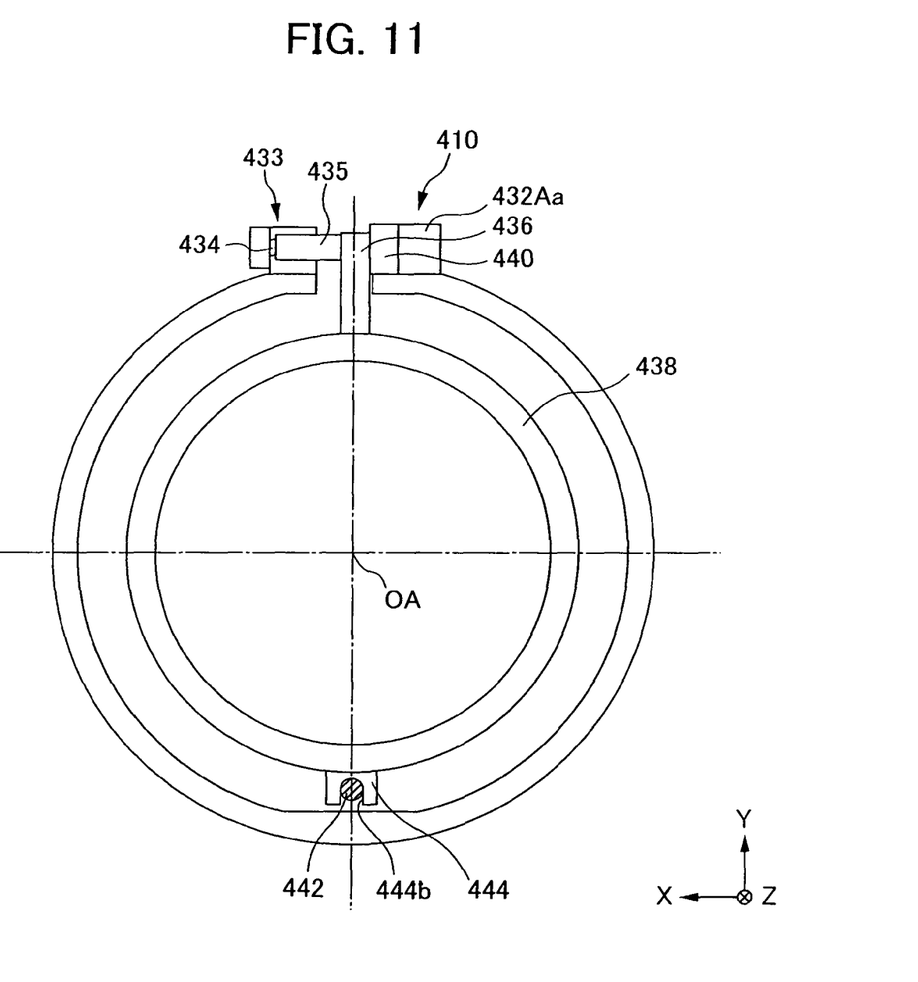
FIG. 11 is a drawing explaining a vibration actuator according to a fourth embodiment of the present invention.

FIG. 11 is a drawing explaining a vibration actuator 410 according to the fourth embodiment of the present invention. In the fourth embodiment, a moving element 436 and an AF ring 438 are integrally manufactured. Others except for this difference described above are the same as the first embodiment, and explanations thereof will not be repeated. A vibrating element 435 is in pressure contact with a moving element 436 by a pressurizing spring 434, which is disposed between the vibrating element 435 and a support member 433. The moving element 436 is pressed towards the linear guide 440 by a pressurizing spring 434, and is linearly driven parallel to an optical axis OA by a driving force applied by the vibrating element 435.

A guide portion 444 having a u-shaped groove 444b in the same manner as in the second embodiment is formed at a position symmetric about the optical axis OA with respect to a portion of an AF ring 438 where a moving element 436 is provided. In the present embodiment, unlike the first or second embodiment, a first linear rail is not provided and only a second linear rail 442 is provided.

The second linear rail 442 is inserted into the groove 444b of the guide portion 444. The groove 444b is also u-shaped in the same manner as in the second embodiment, such that it is possible for the second linear rail 442 to escape with respect to the guide portion 444 in a radial direction.

In the present embodiment, by integrating the moving element 436 and the AF ring 438, it is possible to omit the first linear rail, therefore reducing the number of parts.

Further, a direction of pressurizing the vibration actuator 410 is arranged to coincide with the circumferential direction of a lens barrel and a space for taking out an output of the moving element 436 is provided in the radial direction of a lens barrel 30 in the same manner as in the above described embodiments. As a result, it is possible to connect the moving element 436 integrally with the AF ring 438.

In the above described embodiments, the vibrating element is employed, in which the longitudinal primary vibration mode and a bending secondary vibration mode are combined. However, it may be alternatively possible to adopt other combinations of vibration modes, such as a vibration actuator combining a longitudinal primary vibration mode and a bending fourth vibration mode. As long as a linear vibration actuator is adopted, it may provide the similar effects.

Modified Example

It is assumed in the embodiments described above that the pressure applied to the vibrating element 35 is oriented in the direction orthogonal to and not intersecting the optical axis OA. However, it may alternatively be possible that the pressure is oriented in a direction not intersecting the optical axis OA, such as being skew with respect to the direction of the optical axis OA. In addition, it may alternatively be possible that the pressure is oriented in a direction not intersecting the optical axis OA, such as being slightly inclined from a direction orthogonal to the optical axis OA.

What is claimed is:

1. A lens barrel comprising:
 a linear vibration actuator; and
 a lens ring,
 the linear vibration actuator comprising:
 a vibrating element configured to generate a driving force at a driving face in parallel with an optical axis by an electromechanical conversion element;
 a relative motion member configured to be in pressure contact with the driving face and to linearly move in parallel with the optical axis with respect to the vibrating element by the driving force; and
 a pressurizing mechanism configured to apply a pressure force between the driving face of the vibrating element and the relative motion member,
 the lens ring being configured to hold a photographic lens and to be linearly moved by the relative motion member in parallel with the optical axis, wherein
 the linear vibration actuator comprises a first linear guide which receives the pressure force applied to the relative motion member, and
 the lens ring comprises a second linear guide which guides the lens ring to linearly move and a coupling portion that couples with the relative motion member and through which the second linear guide extends.

2. The lens barrel according to claim 1, wherein a center axis of the relative motion member coincides with a center axis of the second linear guide on a line in a radial direction of the lens barrel.

3. The lens barrel according to claim 1, wherein the second linear guide comprises two linear guides disposed circularly symmetric to each other, with respect to the lens ring, and one of the two linear guides is held moveably in a radial direction centered about the optical axis.

4. The lens barrel according to claim 1, wherein the lens barrel is employed in a camera.

5. A lens barrel comprising:
 a vibration actuator;
 a lens ring;
 a fixed tube, and
 a coupling portion,
 the vibration actuator comprising:
 a vibrating element configured to generate a driving force at a driving face in parallel with an optical axis by an electromechanical conversion element;
 a relative motion member configured to be in pressure contact with the driving face and to linearly move in parallel with the optical axis with respect to the vibrating element by the driving force; and
 a pressurizing mechanism configured to apply a pressure force between the driving face of the vibrating element and the relative motion member in a direction not intersecting the optical axis,
 the lens ring being configured to hold a photographic lens and to be linearly moved by the relative motion member in parallel with the optical axis, along with the relative motion member,
 the lens ring being disposed in the fixed tube, and
 the coupling portion having one end fixed at the lens ring and the other end extending outwardly from the fixed tube, wherein
 the vibration actuator is configured to be disposed radially outward from the fixed tube and to linearly move the lens ring via the coupling portion that couples with a portion of the moving element, and
 the moving element and the coupling portion are coupled in a direction parallel to a direction in which the pressure force is applied.

6. The lens barrel according to claim 5, wherein the pressurizing mechanism applies the pressure force in a direction twisted with respect to the optical axis.

7. The lens barrel according to claim 5, wherein the pressurizing mechanism applies the pressure force in a direction substantially orthogonal to and not intersecting the optical axis.

8. The lens barrel according to claim 5, wherein the pressurizing mechanism applies the pressure force in a direction tangential to a circumference of a circle centered about the optical axis.

9. The lens barrel according to claim 5, wherein the vibrating element, the relative motion member and the pressurizing mechanism are arranged in parallel with each other in a direction not intersecting the optical axis.

10. The lens barrel according to claim 5, further comprising:
 a first linear guide fixed at a fixing portion and extending in parallel with the optical axis; and
 a second linear guide fixed at the fixing portion and extending in parallel with the optical axis, the second linear guide being arranged symmetrically with the first linear guide with respect to the optical axis, wherein the lens ring comprises a first guide portion and a second guide portion, the first guide portion being configured to be guided to move by the first linear guide and the second guide portion being configured to be guided to move by the second linear guide, and the second guide portion is supported moveably with respect to the second linear guide in a circumferential direction centered about the optical axis.

11. The lens barrel according to claim 10, wherein the lens ring comprises a third guide portion that is integrally connected to the relative motion member and arranged symmetrically with the relative motion member with respect to the optical axis, and the lens barrel comprises a third linear guide that is fixed at the fixing portion, extends in parallel with the optical axis and guides the third guide portion.

12. The lens barrel according to claim 5, wherein the lens barrel is employed in a camera.

13. A lens barrel comprising:

a linear vibration actuator; and a lens ring, the linear vibration actuator comprising:

a vibrating element configured to generate a driving force at a driving face in parallel with an optical axis by oscillation of an electromechanical conversion element;

a relative motion member configured to be in pressure contact with the driving face and to linearly move in parallel with the optical axis with respect to the vibrating element by the driving force; and a pressurizing mechanism configured to apply a pressure force between the driving face of the vibrating element and the relative motion member in a direction twisted with respect to the optical axis, the lens ring being configured to hold a photographic lens and to be linearly moved by the relative motion member in parallel with the optical axis, along with the relative motion member, the lens ring comprising a second linear guide which guides the lens ring to linearly move and a coupling portion that couples with the relative motion member and through which the second linear guide extends.

* * * * *